United States Patent
Balan

(10) Patent No.: US 7,642,365 B2
(45) Date of Patent: Jan. 5, 2010

(54) MULTIPHASE REACTOR DESIGN INCORPORATING FILTRATION SYSTEM FOR FIXED—BED CATALYST

(75) Inventor: Prakash G. Balan, Wilmington, DE (US)

(73) Assignee: Lyndell Chemical Technology, L.P., Greenville, DE (US)

( * ) Notice: Subject to any disclaimer, the term of this patent is extended or adjusted under 35 U.S.C. 154(b) by 406 days.

(21) Appl. No.: 11/890,183

(22) Filed: Aug. 3, 2007

(65) Prior Publication Data

US 2008/0009657 A1   Jan. 10, 2008

Related U.S. Application Data

(62) Division of application No. 10/385,180, filed on Mar. 10, 2003, now Pat. No. 7,279,145.

(51) Int. Cl.
*C07D 301/06* (2006.01)
*B01J 8/02* (2006.01)

(52) U.S. Cl. ...................... 549/524; 422/211; 422/227; 422/238; 422/239

(58) Field of Classification Search ............... None
See application file for complete search history.

(56) References Cited

U.S. PATENT DOCUMENTS

| | | | |
|---|---|---|---|
| 3,998,932 A | 12/1976 | Collina et al. | |
| 4,594,228 A | 6/1986 | Lambert et al. | 422/218 |
| RE32,562 E | 12/1987 | Litz | 261/91 |
| 4,971,771 A | 11/1990 | Stahl | |
| 5,132,472 A | 7/1992 | Durante et al. | 568/910 |
| 5,234,883 A | 8/1993 | Schaefer-Sindlinger et al. | 502/339 |
| 5,500,199 A | 3/1996 | Bellussi et al. | |
| 5,856,533 A * | 1/1999 | Sweeney et al. | 549/523 |
| 5,972,661 A | 10/1999 | Kubera et al. | |
| 6,106,803 A | 8/2000 | Hasenzahl et al. | |
| 6,376,686 B1 | 4/2002 | Balan | |
| 2001/0022954 A1 | 9/2001 | Sakashita et al. | |

* cited by examiner

*Primary Examiner*—Jennifer A Leung
(74) *Attorney, Agent, or Firm*—Kevin M. Carroll

(57) ABSTRACT

A unique reactor configuration especially suitable for interphase mass transfer and mixing of multiple phases, i.e. gas(es), liquid(s), and solid(s) where reaction is catalyzed by a solid catalyst comprises a draught tube reactor wherein the solid catalyst particles are maintained in an annular space between the draught tube of the reactor and an annulus-defining wall by means of filter elements positioned downstream and optionally also upstream from the catalyst bed.

10 Claims, 3 Drawing Sheets

MULTIPHASE REACTOR DESIGN INCORPORATING FILTRATION SYSTEM FOR FIXED—BED CATALYST

This is a division of application Ser. No. 10/385,180, filed Mar. 10, 2003, now U.S. Pat. No. 7,279,145.

BACKGROUND OF THE INVENTION

1. Field of the Invention

The present invention is directed to a reactor configuration especially useful in heterogenous reactions employing a solid catalyst in a liquid phase, and to an olefin epoxidation process employing such a reactor.

2. Background Art

The majority of propylene oxide produced today is produced by so-called "coproduct" processes in which an easily oxidizable substrate is oxidized to produce hydroperoxides and/or peroxides, which are then used to "indirectly" oxidize propylene. The reduction products of the oxidized substrate are generated in large quantities and sold as coproducts. Typical coproducts are styrene and methyl-t-butylether. Since the process necessitates purchase of the oxidizable substrates and sale of coproduct, the price of each of which may vary widely, "direct oxidation" processes have been sought wherein market fluctuations do not dictate the overall economy of the process.

While epoxidation of ethylene with oxygen over a supported silver catalyst has been widely used, an analogous oxidation of propylene is not viable. Recent research activity directed to "direct oxidation" of propylene has concentrated on use of hydrogen peroxide, generated externally or in situ, in the presence of titanium silicate zeolites such as titanium silicalite as catalysts. The solid crystalline catalyst particles may be treated to contain a noble metal which catalyzes hydrogen peroxide production from hydrogen and oxygen. If such a process could be commercially practiced, only low cost reactants would be used, and no coproduct produced.

In U.S. Pat. No. 6,376,686, an olefin epoxidation process is described employing a solid catalyst in a reactor configuration similar to that disclosed in U.S. Pat. No. 5,972,661, herein incorporated by reference. In the latter patent, a "draught tube" reactor is disclosed, a simplified schematic of which is illustrated by FIG. 1. The reactant slurry, including solid catalyst, enters the central draught tube and is directed along the axis of the draught tube by impeller(s) therein. A series of vertically oriented baffles positioned between impellers prevents a swirling flow which might cause solid catalyst segregation. Upon reaching the end of the draught tube, the slurry flows in a countercurrent direction through an annulus between the draught tube and the reactor wall. Product is continuously removed, separated from entrained catalyst, and worked up to remove solvent, byproducts, etc. Catalyst must be returned to the reactor. The reactor configuration has been found to exhibit high mass transfer and mixing rates. The catalyst is a combination of active ingredient and inert binder. Under intense agitation, the catalyst can gradually undergo break-up producing fines that lead to pluggage of filtration equipment. The fines could also pass through the filtration equipment resulting in catalyst loss from the reactor-filter setup.

It would be desirable to produce a reactor configuration which can take advantage of the mass transfer characteristics of a draught tube reactor while causing less catalyst attrition.

SUMMARY OF THE INVENTION

The present invention pertains to a draught tube reactor wherein the catalyst is located in a fixed bed in an annulus between an internal draft tube and the reactor wall, the catalyst maintained in the annulus by means of filter media preferably located both above and below the catalyst bed. Because the catalyst is not circulated as a slurry, catalyst attrition is minimized, allowing use of a variety of catalyst particles, including catalyst particle agglomerates.

DETAILED DESCRIPTION OF THE PREFERRED EMBODIMENTS

Figure 1:
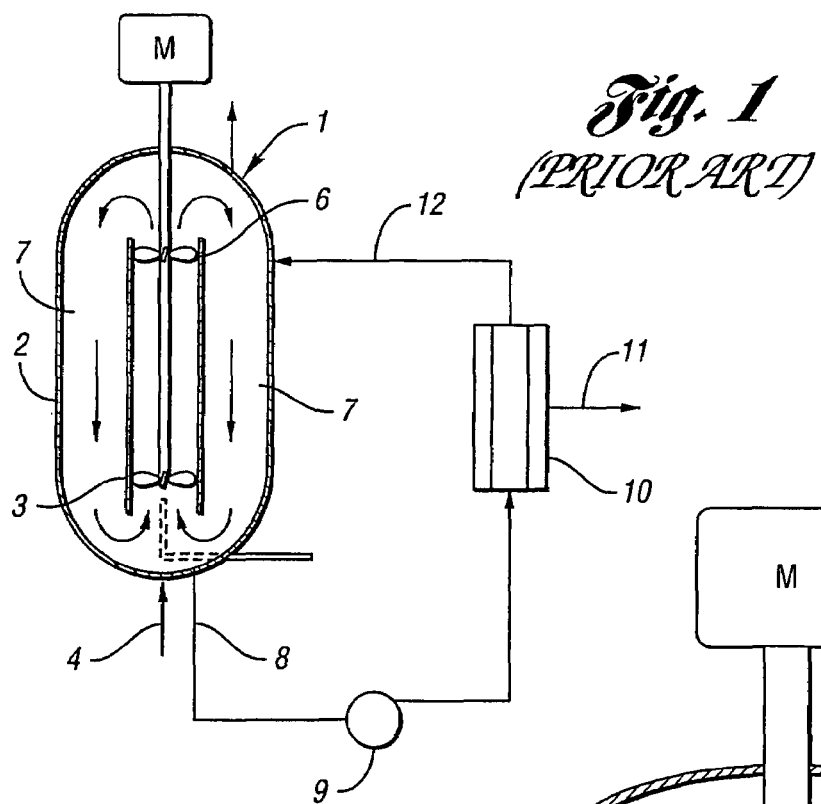
FIG. 1 illustrates the use of a prior art draught tube reactor in a reaction wherein a slurry of solid catalyst is circulated.

FIG. 1 illustrates a prior art draught tube reactor 1 which may be used for a heterogeneous reaction, and contains slurried solid catalyst. Within the reactor shell 2 is draught tube 3 into which relevant feed streams are introduced, here a liquid feed line 4 and vapor (gas) feed line 5. Within the draught tube are impellers 6 driven by motor M which induce upwards flow through draught tube 3 and thorough mixing of the reactant feed streams and catalyst slurry. At the top of draught tube 3, the reaction mixture slurry flows countercurrently through the annular space 7 between draught tube 3 and the reactor wall 2. A portion is recirculated back through the bottom of draught tube 3, while a further portion is taken off at outlet 8 and pumped by circulation pump 9 through filter 10. Filtered product stream 11 is removed and processed to remove product, unreacted starting materials, recycle solvent, etc., while a solid catalyst enriched slurry 12 is returned to the reactor. Catalyst fines generated by attrition of solid catalyst in the reactor, pump, and circulation lines accumulate on filter 10, eventually plugging the filter.

Figure 2:
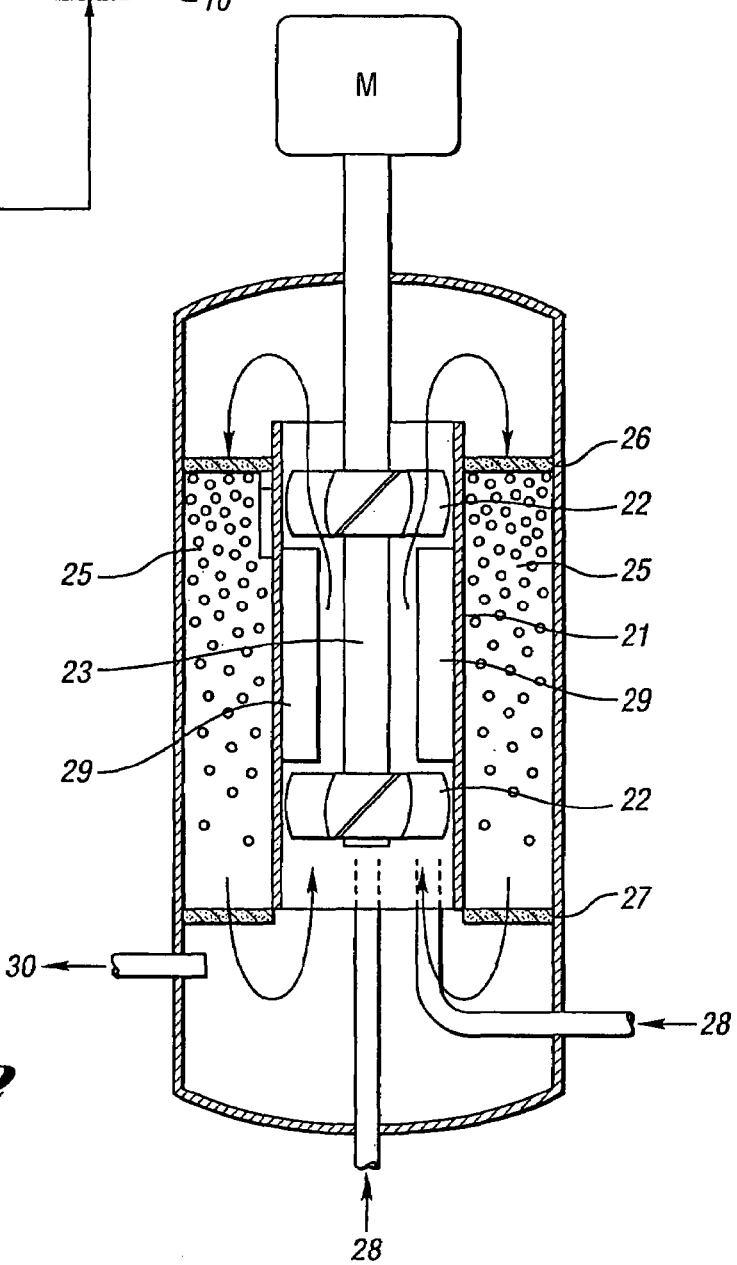
FIG. 2 illustrates schematically a draft tube reactor of the present invention wherein a fixed bed of catalyst is employed in the reactor annulus.

In the present invention, solid catalyst particles are maintained in an annulus between the central draft tube and the reactor walls. With reference to FIG. 2, the central draft tube 21 contains impellers 22 mounted on shaft 23 driven by motor M. Between draught tube 21 and the reactor wall 24 is an annulus 25 which contains solid catalyst. Surmounting the annulus 25 is a filter plate 26. A second filter plate 27 is located at the bottom of the annulus. The filter plates may be made of sintered metal, ceramic, metal mesh, etc. Reactants enter the reactor through one or more inlets 28, and are intimately mixed in the draught tube, which optionally contains baffles 29 between the impellers. Upon reaching the end of the draught tube, the liquid contents are directed through filter plate 26 down through the catalyst bed, and through filter plate 27. A portion of the liquid reenters the draft tube, while a portion is drawn off at outlet 30 for separation of product and appropriate treatment/recycle of other components.

The reactor of the present invention is particularly useful where streams of various reactants, preferably also including gaseous reactants, must be intimately mixed and contacted with solid, heterogeneous catalyst. The reactor is particularly useful for "direct" olefin epoxidation reactions, but its use is not limited thereto. In the description which follows, olefin epoxidation will be used to illustrate the use of the reactor.

In the case of propylene epoxidation, for example, the epoxidation catalyst may be palladium treated titanium silicalite crystals of large size such that reasonable back pressure can be maintained, or may be relatively large agglomerates of titanium silicalite crystals such as those disclosed in U.S. Pat. Nos. 5,500,199 and 6,106,803. The reactant feed streams may comprise propylene, hydrogen, oxygen, liquid phase, i.e. methanol, inert gas such as a volatile hydrocarbon or nitrogen, carbon dioxide, argon, etc. The product stream will ordinarily comprise unreacted gases which can be separated and recycled, solvent which is ordinarily recycled, and propylene oxide and "propylene oxide equivalents," i.e. ring opened and various condensation products. The propylene oxide product is separated and purified by methods well known to those skilled in hydrocarbon processing, preferably by a series of fractional distillations. Any attrited catalyst will accumulate in the first distillation bottoms unless previously separated by other techniques such as centrifugation. Recovered catalyst fines may be processed to recover noble metal values.

Because the catalyst particles are not exposed to the high shear forces of impellers or pumps, attrition is very low. Any fines generated by attrition can be allowed to accumulate in distillation bottoms for periodic removal rather than employing small pore filters subject to blockage. However, due to the small quantity of fines, filtration or removal by centrifugation or other techniques remain options with the present reactor.

The reactor design is preferably such that filter elements may be changed periodically. The filter elements generally also require physical support. A reactor configuration allowing for such features is illustrated in FIG. 3, although numerous methods of supporting the filter elements will suggest themselves to those skilled in chemical engineering and reactor design.

Figure 3:
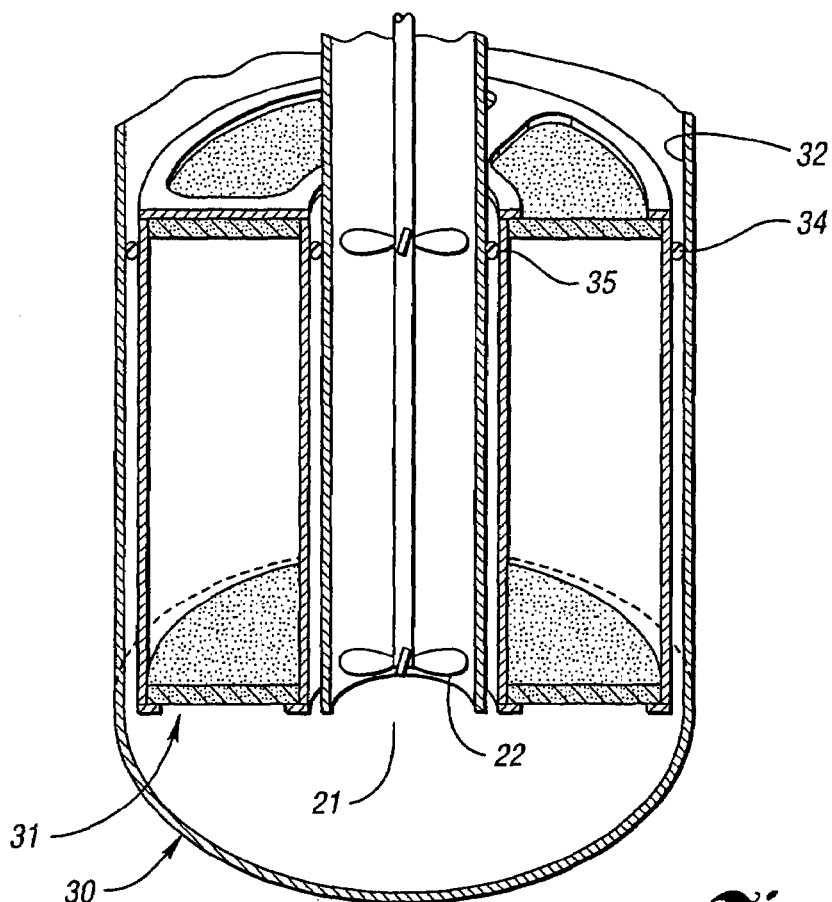
FIG. 3 illustrates one embodiment of a draught tube reactor in accordance with the present invention employing a catalyst basket.

In FIG. 3, a generally cylindrical reactor 30 contains a "catalyst basket" 31 as an integral assembly. The catalyst basket is preferably close fitting to the interior wall 32 of the reactor. Fluid flow around rather than through the catalyst basket is prevented by o-ring seals 34 and 35, although other arrangements may also be suitable. For example, a receiving land may be made in the wall of the reactor on which the basket is mounted. Mounting may be effected, for example, by a ring of bolts, and a gasket may be placed between the receiving land and the basket. Although the entire reactor is generally maintained at high pressure, the pressure is substantially equalized over the entire interior volume, and thus the o-rings, gaskets or like devices need only be able to handle the pressure differential dictated by liquid flow. In many cases, o-rings, gaskets and the like may be dispensed with. The basket surrounds draught tube 21 and impellers 22. In some designs, an inner wall of the basket may constitute the walls of the draught tube.

The catalyst basket 31 may be assembled by any techniques acceptable in chemical engineering and metal fabrication, for example by assembly of the parts shown in FIGS. 4a-4e. In a preferred embodiment, a top ring 36 is machined with lands 38 and 40 to receive an inner tube 37 and an outer tube 39, the inner tube serving as the draught tube of the reactor or a portion thereof, or having dimensions so as to surround a fixed central draught tube. A bottom ring 48 with similar lands 42 and 44 is also prepared. Ordinarily, the inner and outer tubes are welded to the lands to produce the basic catalyst basket. The top ring is shown from above in FIG. 4c which also illustrates the bottom ring from below.

Figure 4A:
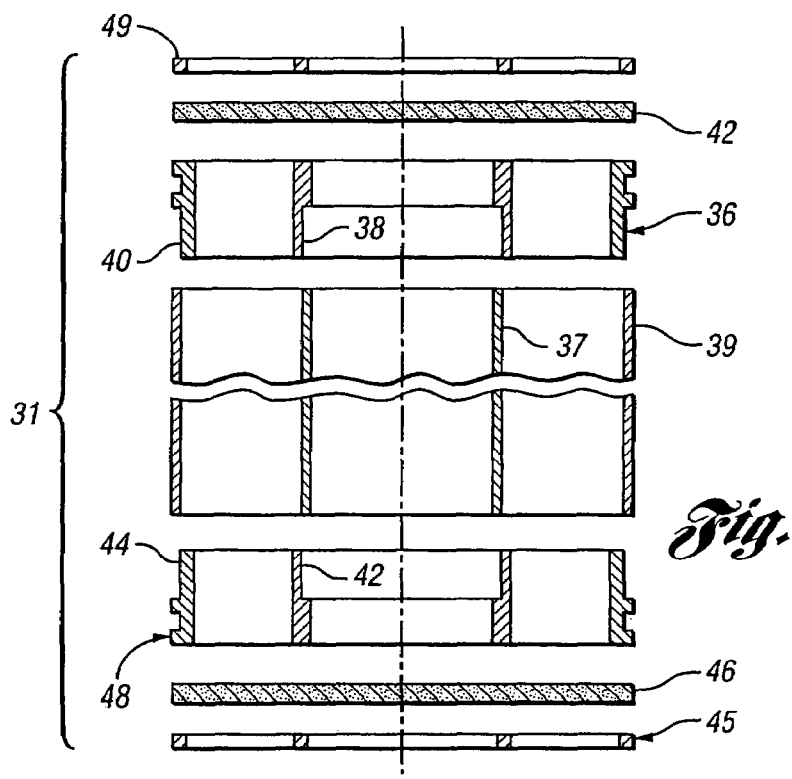
FIGS. 4a-4e illustrate construction of one embodiment of a catalyst basket.
Figure 4B:
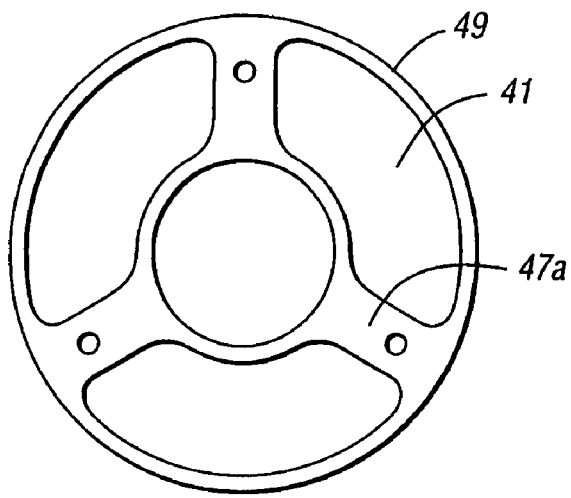
Figure 4D:
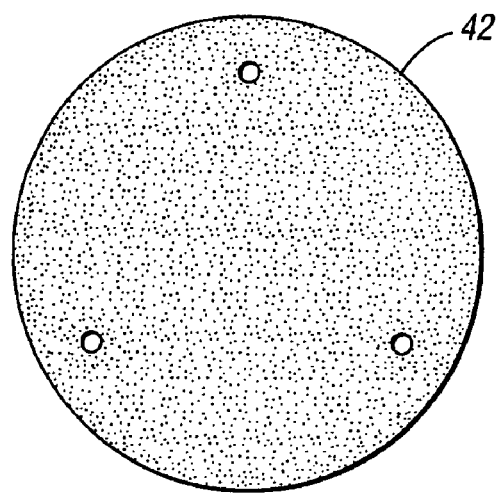
Figure 4C:
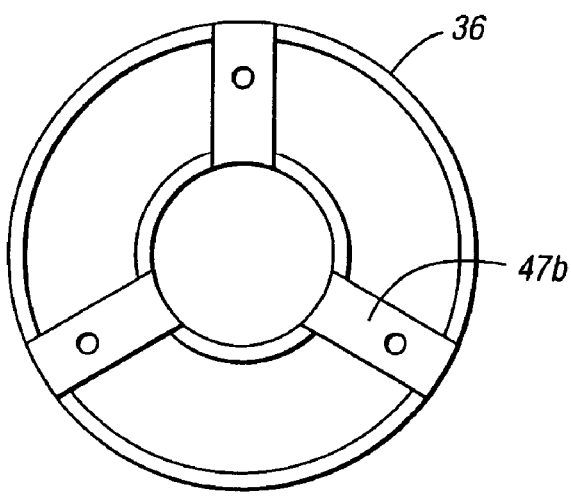
Figure 4E:
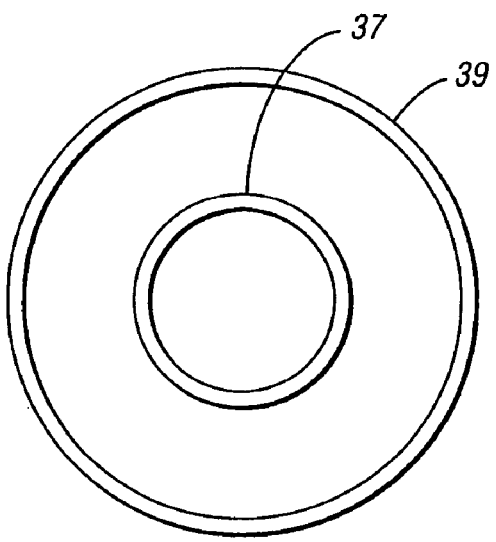

A top cover 49 which spans the annular space between the outer sleeve 39 of the catalyst basket and the draught tube 37 is mountable onto the top ring. The cover contains through passages 41 (refer to FIG. 4b), and a top filter element 42 is generally positioned between the top cover and the top ring 36. If the fluid flow is from the top of the draught tube through the top of the annular space of the filter basket, the top filter element 42 may be quite coarse in pore size, and may take the form of one or more stainless steel mesh layers, for example. In other cases, so long as fluid flow is constantly maintained, the topmost screen may be dispensed with. However, such an embodiment is not preferred. FIG. 4b illustrates the top and bottom covers from above and below. FIG. 4c represents a top view of ring 36 showing portions 47b which allow the top cover 49 to be mounted to the top ring 36 by holes located in corresponding structures 47a. FIG. 4d illustrates the top and bottom filters, while FIG. 4e illustrates the relationships between the inner and outer tubes.

At the bottom of the filter basket is a similar bottom cover 45. Between the bottom cover 45 and the bottom ring is secured a bottom filter element 46. This bottom filter element 46 should be manufactured with a pore size so as to retain the solid catalyst, except for a minor amount of catalyst fines. A suitable nominal pore size may be, for example, 4-10 μm. It is expected that some catalyst fines with sizes less than 1 μm will be able to pass through such a filter element. This is particularly so of particles of about 0.2 μm or less, which are most problematic in plugging catalyst filters. However, the amount of such fines will be quite small. The bottom filter element 46 may be made of fine mesh screen, but is preferably a sintered metal or ceramic filter element. If a bed of very fine catalyst particles, i.e. <1 μm in size is contemplated, the bottom filter element will be made of more finely pored material.

A reactor may contain a single catalyst basket or a plurality of baskets with no sealing means therebetween or with conventional seals, for example o-rings, gaskets, etc. Prevention of liquid flow from between the baskets rather than from end to end may also be prevented by lining the composite draught tube with a tubular liner, or by other means. For example, the reactor may contain a draught tube fixed in position, and catalyst baskets may be provided with a central opening having an internal diameter such that the basket may be inserted between the reactor wall and fixed draught tube.

The use of catalyst baskets allows the baskets to be easily replaced in a reactor to supply fresh catalyst, repair filter elements, etc., without the down time which would be required with other reactor designs. However, a reactor may be assembled in any way deemed commercially feasible. For example, when filter elements are sintered stainless steel, they may be supplied in the form of disks with a central hole, and welded both to the draught tube on the one hand and the reactor wall on the other. It is preferable that the design of the filter elements and/or their mode of mounting into the reactor or catalyst basket allow for removal of spent catalyst and replacement thereof. In designs where the filter pores are made purposefully large such that fines may escape the reactor, provision may also be made for inserting additional catalyst during operation, for example in the form of a slurry of fresh catalyst introduced directly into the annular space of the reactor or into a catalyst basket, when used.

The direction of flow through the draught tube is preferably established by the impellers, although upward flow of gaseous or liquid reactants can be used to establish flow in impeller-less configurations. When impellers are used, flow may be upwards or downwards. Reactors may also be positioned horizontally. Vertical reactors with upward, impeller-driven flow through the draught tube are preferred.

Reactant, solvent, and other feed streams are generally introduced into the reactor near the end of the draught tube or within it. The excellent mixing action of the impellers in the draught tube mix the ingredients very effectively. Maximum solubility of gases such as hydrogen and oxygen is rapidly achieved for example. By the time the liquid in the draft tube exits the tube and begins flow through the catalyst bed, the reactants have been thoroughly mixed.

As the reactants flow through the catalyst bed, the catalytic processes occur, and products, byproducts, unreacted starting reactants, etc. exit the catalyst bed. Since the catalyst may be of large size without fearing attrition, a significant amount of catalyst may be used, for example for in excess of the amount which could be retained in a slurry of particles in a conventional reactor. As a result, a greater proportion of reactants can be reacted, and fewer unreacted starting materials may exit the catalyst bed.

The product take off is generally from the end of the reactor proximate the exit from the catalyst bed. In vertical reactors with upward draught tube flow, the take off will preferably be below the bottom annular filter element. Other product outlets are of course possible. The product take off may be proportioned to require recirculation of a portion of the liquid exiting the filter bed back through the draught tube and from there again through the filter bed. In this manner, the conversion efficiency may be adjusted optimally.

The product stream may be routed directly to purification/recovery/recycle, or may serve as an inlet stream to a further reactor to further maximize reaction. Where a second reactor is used, it may be of the same type or a different type. It may, for example, be a simple tubular reactor with solid catalyst located between filter elements. One or more additional inlet streams may be fed to the second reactor to minimize reactants present in the first reactor product stream, or to adjust the content of permanent gases to non-explosive limits. For example, when the product stream contains unreacted hydrogen and oxygen, additional propylene may be added to lower the oxygen content. Methane, ethane or propane may be added to adjust limits of flammability, etc.

The product stream generally includes unreacted condensable or permanent gases, i.e. hydrogen, oxygen, propylene, nitrogen, methane, etc., reactor solvent, and a product mixture. The product mixture contains propylene oxide and "propylene oxide equivalents," i.e. propylene glycol, dipropylene glycol, propylene glycol methyl ether, among others. The permanent gases may be removed by flashing or other techniques, and recompressed and reused. Alternatively, they may be injected into a boiler for their fuel value. Propylene and condensable gases are preferably recovered and recycled. Solvent, i.e. methanol, is also preferably recycled. Separation of propylene oxide from propylene oxide equivalents and other impurities may be performed using conventional distillation techniques.

The pore size of the filter elements may be varied to suit the particular catalyst size and expected generation of fines by attrition. Suitable nominal pore sizes range from 0.1 μm to 40 μm, more preferably from 1 μm to 20 μm, and most preferably in the range of 4 μm to 15 μm. A feature of the present invention is that the catalyst size is of lesser importance then in other systems where a catalyst slurry is circulated. Small catalyst particle sizes may be used with beds of increased cross-sectional area to minimize pressure drop, for example. When such small catalysts are used, filter element pore size should be on the low side of the above range. When large size catalysts, i.e. from 2 μm to 40 μm or more are used, pore size may be increased upwards. In catalysts of sizes in the range of 6-12 μm, for example single large titanium silicalite crystals, a nominal pore size of 3-4 μm is believed adequate. Although it would appear that such filters would allow passage of relatively large "fines," i.e. 2-3 μm, it has been found in practice that such "coarse" filters do not generally allow passage of such particle sizes, perhaps due to the serpentine nature of the pores created by the sintering process used to form the filter elements. The pore size may be selected specifically to allow passage of some fines, particularly those of very small particle size. These fines will ordinarily accumulate in the product distillation bottoms, and because of their small quantity, do not pose a separation problem.

By "substantially preventing" catalyst from leaving the catalyst bed is meant that the majority of catalyst will be retained in the bed, as just described above. Preferably, the pore size will be such to substantially prevent passage of catalyst particles having particles sizes in excess of 20% of the mean volumetric catalyst particle size charged to the reactor.

By the term "solid catalyst" as used herein is meant a particulate catalyst which is located in the catalyst bed such that a flow of fluid may be directed through the catalyst bed. The resistance to flow is related to the size of the catalyst particles and their geometry, the back pressure of the catalyst bed increasing per incremental cross-sectional area as the particle size decreases. Catalyst particles which cannot pack closely together or which provide roughly spherical geometries allow increased fluid flow. For a given fluid flow in L/h, the flow may be increased or decreased with a given size and morphology of catalyst particles by correspondingly increasing or decreasing the cross-sectional area of the annular space in which the catalyst residues. The flow will also be influenced by the length of the catalyst bed. Since catalyst attrition is less severe in the reactors of the present invention, relatively large amounts of catalyst may be used, since the operational lifetime of the catalyst is dramatically increased.

Preferred filter elements are made of sintered porous stainless steel. Such sintered filter products are available from Mott Corporation.

Numerous variations of the reactors disclosed are possible without departing from the spirit of the invention. For example, the reactors may be configured with heating and/or cooling elements, i.e. fins, plate exchangers, coils, loops, etc. Additional mixing elements may also be added, as well as liquid recirculation loops, etc. What is required minimally is a draught tube reactor with an annular space between the draught tube and the interior wall of the reactor, this annular space having a solid catalyst disposed therein, and maintained in the annulus by means of at least one and preferably two filter elements, at least one filter element located beyond the catalyst bed relative to the direction of fluid flow. It should be noted that the term "central" used in describing the location of the draft tube does not imply that the draft tube is absolutely centered in the reactor. It may be offset from center, for example. By "in the annular space" referring to filter element location is meant either within or atop the annular space such that fluid is substantially prevented from entering or leaving the annular space, as the case may be, without passing through the filter element. The filter element may, for example, be located above the annular space as shown in FIG. 3.

In certain preferred embodiments, flow of soluble reactants, solvents, and reaction products may be desired to occur across or through the walls of the draught tube. Such embodiments may be particularly useful where a catalyst basket is used which has porous sides, i.e. sides of metal mesh material. Such flow through the draught tube walls may be facilitated by perforating the walls with holes, slots, etc., or by constructing all or a portion of the draught tube of porous material, i.e. of porous sintered stainless steel. These embodiments are illustrative and not limiting.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. In the claims, the terms "a" and "an" mean "one or more than one" unless indicated otherwise.

What is claimed is:

1. In a process for the epoxidation of an olefin in the presence of a solid catalyst in a liquid reaction medium, the improvement comprising epoxidizing said olefin in a reactor having a central draft tube located within said reactor, at least one impeller located within said draft tube, an annular space between the draft tube and a wall of the reactor, and a fluid flow path in only one direction within the draft tube and only countercurrent flow, relative to the direction of fluid flow within the draft tube, through the annular space, said reactor having a) a catalyst bed for the solid catalyst located within said annular space;

b) a filter element in said annular space positioned downstream from said catalyst bed relative to the direction of fluid flow through said annular space, said filter element having pores therein to allow fluid flow through said filter element, said pores of sufficiently small size so to substantially prevent catalyst particles from leaving said catalyst bed;

c) a second filter element having pores therein to allow fluid flow through said second filter element in said annular space upstream from said catalyst bed relative to the direction of fluid flow through said annular space;

said reactor having at least one inlet for an inlet feed stream and at least one product outlet for a product stream, wherein the catalyst bed is contained with a catalyst basket located within said reactor, said catalyst basket comprising:

i) a central tube and a larger annulus-defining tube; and ii) a top ring and a bottom ring, each of said top and bottom rings fixed to both said central tube and said annulus-defining tube, the space between said central tube and said annulus defining tube defining an annular space suitable for receiving a charge of said solid catalyst;

wherein said filter element is positioned above said top ring or within said top ring such that fluid entering said annular space passes through said first filter element, said second filter element is positioned below said bottom ring or within said bottom ring such that fluid leaving said annular space passes through said second filter element, and said central tube surrounding said draft tube or comprising said draft tube, and separating olefin oxide from the product stream thereof.

2. The process of claim 1, wherein said liquid reaction medium comprises an oxygen-containing solvent.

3. The process of claim 1, wherein said solid catalyst comprises a titanium silicalite catalyst.

4. The process of claim 3, wherein said inlet feed stream comprises hydrogen and oxygen and said solid catalyst comprises titanium silicalite treated to contain a noble metal.

5. The process of claim 3, wherein said solid catalyst is an agglomerate of the titanium silicalite bound together with a binder.

6. The process of claim 1, wherein said draft tube contains one or more baffles oriented vertically within said draft tube, and proximate one or more of the impellers.

7. The process of claim 1, wherein one or more of the inlets terminates proximate to an upstream end of said draft tube, relative to the direction of fluid flow within said draft tube, or terminates within said draft tube.

8. The process of claim 1, wherein said product outlet is located downstream from said annular space relative to the direction of fluid flow through said annular space.

9. The process of claim 1, wherein the reactor has a filter support plate positioned intermediate said top ring and said first filter element.

10. The process of claim 1, wherein the reactor has a filter support plate positioned intermediate said bottom ring and said second filter element.

* * * * *